United States Patent

[11] 3,611,406

[72] Inventor James E. Hughes
La Mirada, Calif.
[21] Appl. No. 880,998
[22] Filed Nov. 26, 1969
[45] Patented Oct. 5, 1971
[73] Assignee Chevron Research Company
San Francisco, Calif.

[54] COMBINATION VARIABLE AREA AND WIGGLE-LINE DISPLAY OF SEISMIC SIGNALS
6 Claims, 12 Drawing Figs.

[52] U.S. Cl. .................................................. 346/1,
346/110, 340/15.5
[51] Int. Cl. ...................................................... G01v 1/32
[50] Field of Search ........................................... 346/1, 33
C, 110, 108; 340/15.5 DS

[56] References Cited
UNITED STATES PATENTS

| | | | |
|---|---|---|---|
| 3,158,433 | 11/1964 | Alexander et al. ............. | 346/110 |
| 3,173,743 | 3/1965 | Weissensteiner .............. | 346/33 |
| 3,349,407 | 10/1967 | Hefer et al. ..................... | 346/110 |

Primary Examiner—Joseph W. Hartary
Attorneys—A. L. Snow, F. E. Johnston, R. L. Freeland, Jr. and H. D. Messner ABSTRACT: Seismograms are represented in a combined wiggle trace and variable area display for side-by-side presentation in a seismic time or depth display. Seismic wiggle traces are sine wave representations of earth motion detected by a seismometer and recorded with respect to time. The variable area display portion is presented as a truncated part of each positive going half of each sine wave forming such a seismic trace. The truncated part is filled or darkened as by exposure of a film to a cathode-ray beam under the control of a sawtooth wave. A particular advantage of the present arrangement is that the sawtooth wave is inverted so that the inherently ragged portion at the beginning of each sawtooth wave is blanked out and only the upper, clean part of each line recorded. A common peak level of the sawtooth wave is then positioned on the zero axis so that the positive portion of each half cycle of the seismic signal is cleanly filled. The resulting display is sharper and cleaner than previously known variable area-wiggle trace displays.

COMBINATION VARIABLE AREA AND WIGGLE-LINE DISPLAY OF SEISMIC SIGNALS

FIELD OF INVENTION

The present invention relates to display of seismic signals by photographically recording the instantaneous image of the beam of a cathode-ray tube in response to an applied seismic signal. More particularly, it relates to a method of and apparatus for accurately controlling a cathode-ray beam to record a combined wiggle trace and variable area representation of the amplitude and frequency of a seismic signal.

OBJECT OF THE INVENTION

It is a particular object of the invention to present a cleaner combined wiggle trace and variable area display than has heretofore been possible, by more accurately positioning the cathode ray beam during recording of the variable area portion of each combined seismic signal trace. By using only the peaks of a sawtooth waveform to fill one-half of each cycle of the wiggle trace jiggle, or roughness, in the relatively unstable bottom portion, or trough, of each sawtooth wave is eliminated from the display. In a preferred form of apparatus to carry out the method, the peaks of the sawtooth waves, used to fill the positive half of each cycle of seismic signal trace, are positioned on the zero crossing axis of the wiggle trace portion of the display and the bottom of each sawtooth waveform is arbitrarily lopped off or truncated. In this way the individual traces of the seismic time section (made up of many side-by-side traces) can be placed closer together. Such denser packing of adjacent traces better preserves the visual continuity of adjacent troughs of each seismic signal trace.

BACKGROUND OF THE INVENTION

In present day seismograph exploration, it is customary to record a seismic disturbance generated by an explosion or an impact of the earth at a plurality of geophones. Sonic velocity discontinuities in the earth as between earth formations of different acoustical impedance create reflections that are then detected by the geophones spaced along a line to form a series of spaced stations. Each station of the line includes a geophone, or several electrically connected together, that generates an oscillating electrical signal recordable as a single seismic trace. Usually 24 or more traces are recorded simultaneously. In present day seismic exploration, these traces are individually filtered and adjusted in phase or amplitude to enhance the information content and to reject the noise components or misalignments that normally occur in field recording. The final display of each individual geophone, whether from a raw, or treated, field record or from an office calculated or reconstructed trace, is then recorded in a side-by-side relationship to its adjacent field geophone position on a single graph, called a seismic time section. A plurality of seismic time sections made up of the recorded plurality of traces are then usually combined to form a seismic profile, generally representing several miles of subsurface coverage along a line of survey. Because several hundred traces are required for a complete seismic profile, and in general geologic structure is deduced from a plurality of closely adjacent seismograph traces, it is important that the traces be as closely spaced as possible, but that each individual trace be as clean and clear as the recording process permits.

It has been common heretofore to use various combinations of wiggle trace, variable area or variable density displays to produce seismic time sections, and in turn seismic profiles. One convenient way to record a seismic profile is to photograph the instantaneous deflection of a cathode ray beam on the face plate of a cathode-ray tube. Relative motion between the spot on the cathode-ray tube screen and photographic film produces a sinusoidal curve. It is most customary to rotate a drum with a photographic negative wrapped around it past a focused image of the beam striking the screen of a fixed cathode-ray tube. The cathode-ray beam is deflected only horizontally or laterally to represent amplitude of an individual seismic trace. The drum is rotated in synchronism with the cathode ray beam position on the screen to record the time (and eventually represent depth) versus amplitude representation of each seismic trace. The advantage of the arrangement is that the drum may rotate continuously, but the carriage of the cathode ray tube need move transversely to the drum surface only at the end of each revolution and then only the desired separation width of one seismic trace relative to its neighbor traces on the record. With a straight wiggle-trace display, the amplitudes of the positive and negative going portions of each wave frequently are sufficiently high that there is serious overlap between adjacent traces. To avoid such overlap, variable area and variable density displays of a single line of a given width are frequently used to represent amplitude and frequency variations of each cycle of the seismic signal. However, such variable area or variable density displays are difficult for the seismologist to read and analyze. Accordingly, it is more desirable to present a wiggle trace and then emphasize certain parts by superimposing a variable area display on the wiggle trace.

In previously known variable area and wiggle trace displays, the lines filling the area under one or both sides of the wiggle trace excursions relative to the zero axis have been fuzzy. These lines are formed by oscillating the cathode-ray beam at a frequency substantially higher than the wiggle trace wave. When this wave is of relatively low amplitude, the roughness, or fuzzying of the lines is particularly objectionable.

SUMMARY OF INVENTION

I have found that such roughness in filling the area under the wiggle trace is primarily due to jitter in the initial part of the sawtooth wave used to generate these lines. When this initial part is displayed with its base near the zero-crossing axis of the wiggle trace, and the top of the sawtooth wave is cut off by crossing the wiggle trace or an arbitrary width line, such as the variable envelope of the clipped sine wave peak, the variable area portion may be too ragged to recognize as a signal from the recorded variable area. In accordance with the present invention, a sawtooth wave is inverted and its total amplitude made greater than the expected extrema of the sinusoidal voltage traces representing the seismic signal. The top or peak of each sawtooth wave (as defined by the point of transition from a relatively slow amplitude change to a relatively fast amplitude change as by the retrace between each wave in the sawtooth signal) are set at a predetermined level relative to the mean line or zero-crossing axis of the sine wave. Desirably the points are aligned to lie on the zero-crossing axis. However, in other forms of variable are display, they may lie above or below this line. Additionally, the sawtooth wave is blanked during the time it is near the base line and until it crosses a certain predetermined point, such as the envelope of the clipped sine wave peak, on the wiggle trace.

In a preferred form of apparatus for carrying out the method of the present invention, the photographic film upon which the seismic section is recorded is moved in the time or depth direction by a drum rotating past the beam image on the face of a cathode-ray tube. The face of the cathode-ray tube is then photographed as the cathode ray beam oscillates transversely to the direction of movement of the paper.

BRIEF DESCRIPTION OF DRAWINGS

FIG. 4 is a set of diagrams illustrating the display of an idealized seismic trace generated by the prior art and as modified in accordance with this invention by various parts of the apparatus of FIGS. 1 and 2.

DESCRIPTION OF PREFERRED EMBODIMENTS

Figure 1:
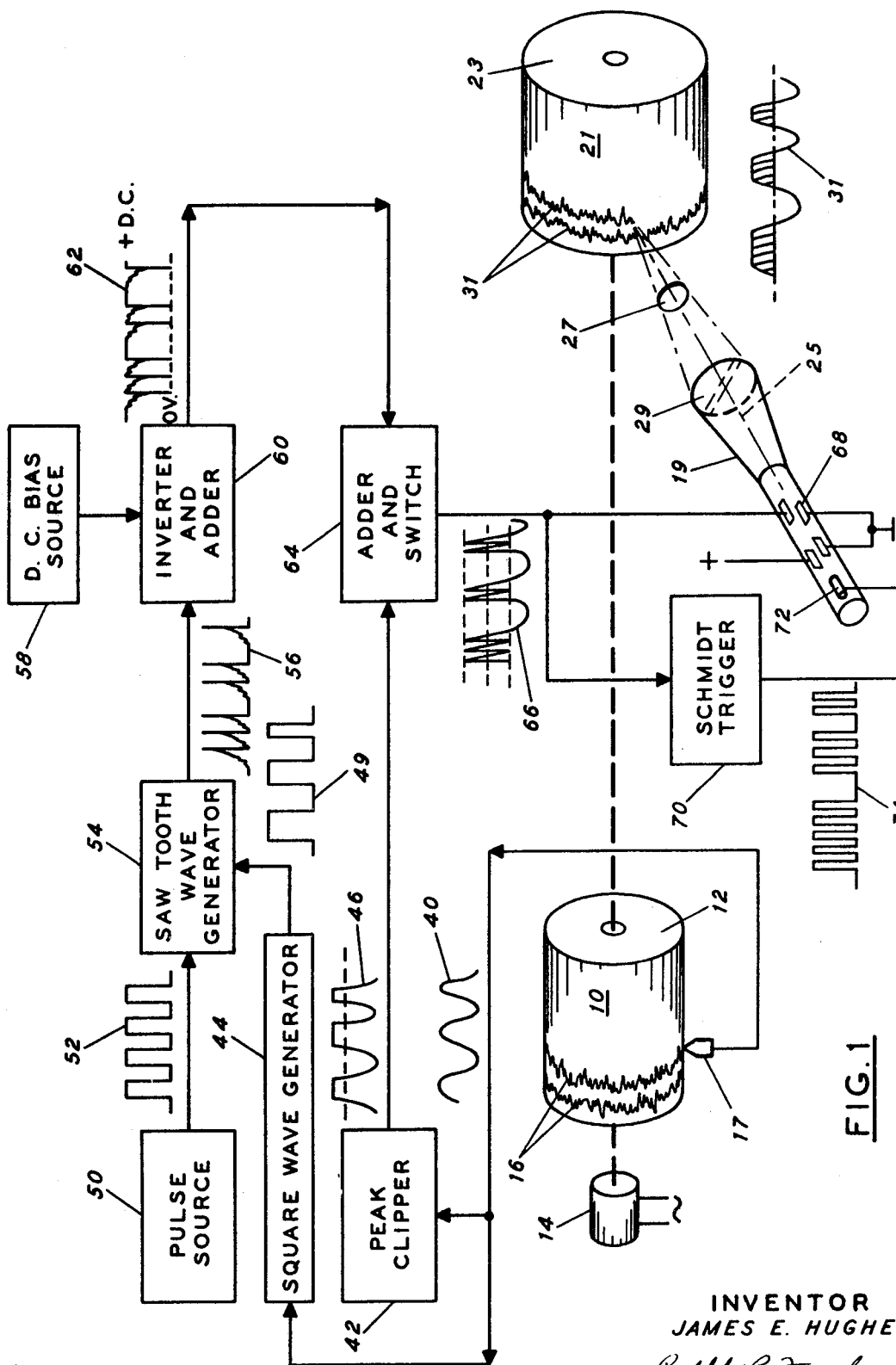
FIG. 1 is a block diagram and schematic representation of a preferred form of apparatus for carrying out the method of the present invention.

FIG. 1 illustrates one form of apparatus for carrying out the method of plotting a combined wiggle trace and variable area representation of a seismic trace to develop a seismic time section and a seismic profile representing several miles of subsurface coverage.

As is well understood in the art of seismic reflection or refraction prospecting, a record of a plurality of geophones is generated by recording electrical signals representing the sinusoidal movement of the earth in response to the impact and reflection or refraction of sonic energy by acoustic discontinuities in the earth layering. The geophones are spaced apart generally along a single line and the signals in modern technology are recorded on magnetic tape. The signals are in the form of digital impulses or an electrical analog of the geophone movement. In the present embodiment the field procedure is not illustrated and the recording begins with a magnetic tape 10, illustrated as being mounted upon rotating drum 12, driven by motor 14. The invisible magnetic records are shown as traces 16 on record 10. For purpose of this representation, an individual pickup 17 is moved from trace to trace. Such movement is normally automatic. It is synchronized with movement of the final recording paper. This is shown schematically by the position of the electron beam 25 on face 29 of cathode-ray tube 19 on photographic paper 21 mounted on drum 23. Rotation of drum 23 is in synchronism with the drive of drum 12. Electron beam 25 of tube 19 is focused on the face of photographic paper 21 by a focusing system indicated as lens 27 which directs the light from face 29 of tube 19 onto a given area of film 21. The display traces are indicated as 31.

The playback system, including magnetic tape 10 and drum 12, as well as the drive of photographic drum 23, relative to cathode-ray tube 19, is well known in the art; the present arrangement illustrates one form by which the method of the present invention may be used.

The output of pickup 17 is a sinusoidal curve of varying frequency and amplitude dependent upon the input seismic signal. An indication of its variations in frequency and amplitude is designated by the input signal waveform 40. In FIG. 1, it is applied to both peak clipper 42 and square wave generator 44. Peak clipper 42 maintains the waveform over the trough of each cycle of wave 40, but clips the top of the peak so that during peak periods the variable area display has a fixed height above the zero axis. The character of the original signal is thus maintained by using only a part of the peak and the full form of the trough in each cycle. The output of peak clipper 42 is indicated as waveform 46 showing full troughs and clipped peaks. Suitable circuitry for performing this function is described in more detail in connection with FIG. 2. A better showing of the waveform 46 may be seen in FIG. 4E. FIG. 4C shows the original waveform designated as 40 in FIG. 1.

Square wave generator 44 squares each wave during its peak, or positive-going, portion of wave 40. The output of generator 44 is indicated as signal 49. This wave controls the time during which the sawtooth wave is generated for use in filling the truncated part of the peaks in the final display. A pulse source 50 supplies a suitably high frequency, such as 20 kiloHertz when the waveform of the original signal 40 is less than about 180 Hertz. The general waveform of the pulse source is designated 52. It is applied with square waves 129 to a sawtooth wave generator 54. This generator creates a generally sawtooth waveform of the general shape shown in FIG. 4B. Designation of the output of generator 54 is shown as signal 56. As best seen in FIG. 4C, the general form of the sawtooth has a generally slow rise from a base line to a peak value of known height, as indicated schematically. The initial part of each sawtooth is somewhat ragged due to electronic triggering and input transients that appear in a final waveform when it is reversing from a sudden vertically downward stroke to a relatively slowly rising upward stroke. The upward stroke requires a substantially longer time than does the total downward stroke. It is because of this ragged initial part that the conventional sawtooth wave applied in the conventional way does not present an attractive, or useful, form of variable area display when used to fill a part of the sinusoidal waveform.

To invert the waveform 56 and to assure that its total height is greater than the expected extrema of the peak amplitude of the input signal, a DC bias source identified as 58 is combined with the input signal 56 in an inverter and adder 60 to produce an output designated as waveform 62. The output of inverter-adder 60 and peak clipper 42 are then combined in an adder and switch 64 to produce the final waveform designated as 66. This waveform is applied to the cathode-ray display tube 19 in two ways. The variations in amplitude are applied to the horizontal deflection plates 68 in synchronism with the motion of drum 23 moving in synchronism with the transverse axis of the wave. At the same time it is also desired to print on photographic film 21 only when the beam is within certain limits as designated by the tops of the clipped peaks. To do this, the cathode-ray tube is blanked when the cathode-ray beam is outside of the given width limitation. For this purpose the Schmitt trigger 70 controls the grid of electron gun 72. The general form of the output of Schmitt trigger 70 to electron gun 72 is indicated by waveform 74.

Figure 2:
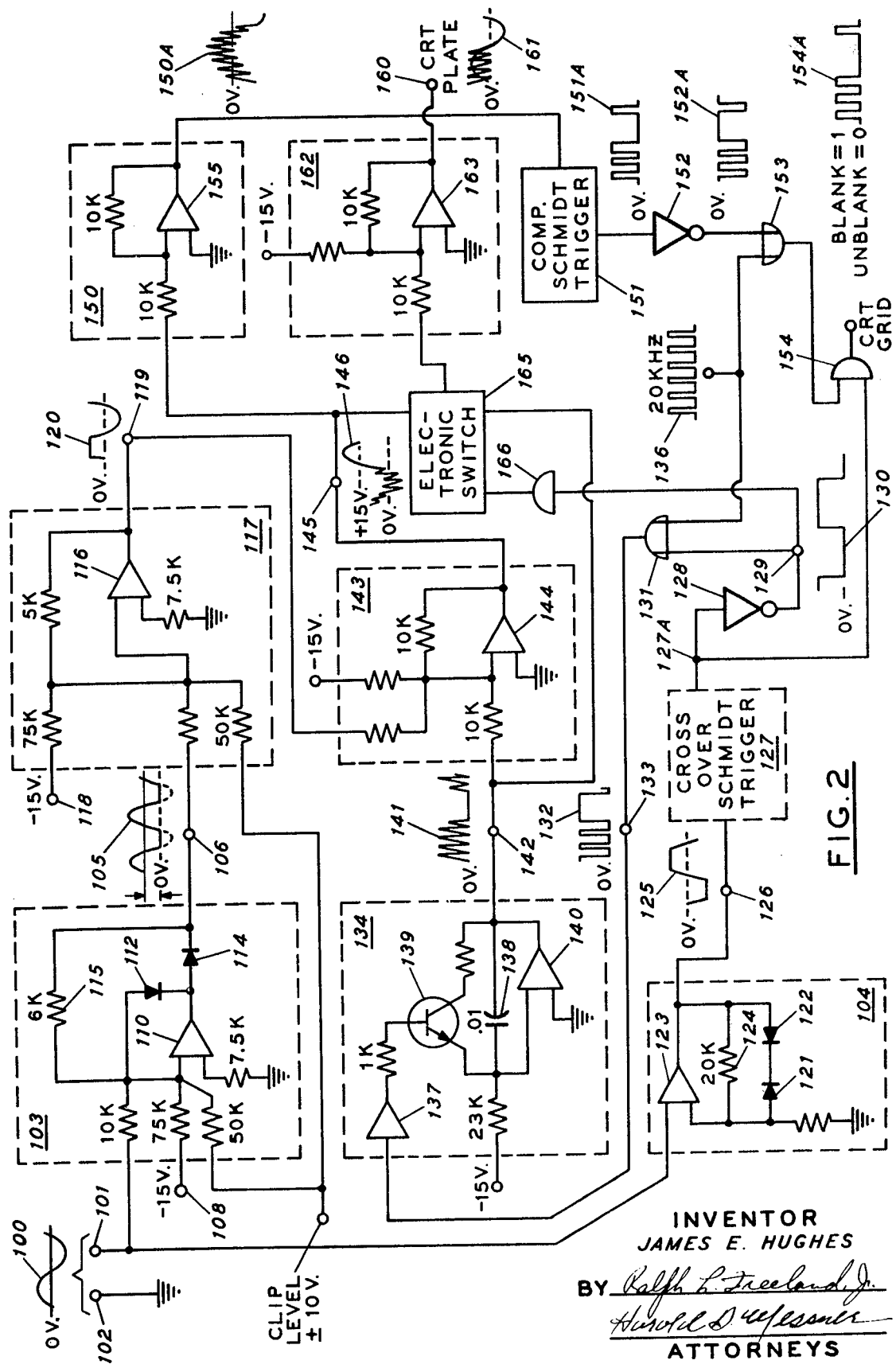
FIG. 2 is a detailed wiring diagram illustrating one form of electronic circuitry used in the arrangement of FIG. 1.

FIG. 2 shows one form of circuit suitable for practice of the method of the present invention. To simplify the explanation of its operation a seismic signal wiggle-trace is indicated as a single cycle of an initially positive-going sine wave 100. Sine wave 100 is applied to terminals 101, 102, and forms the input to the wave conversion circuits indicated as 103 and 104. Circuit 103 controls the height of the positive-going portion of each cycle to hold the trace within an alloted width span on the final record. This permits adjacent traces to be fitted closely together for side-by-side display, as desired by geophysicists who interpret such records. Circuit 104 is a square wave generating circuit that properly merges the sawtooth signal that generates the variable area display on each positive-going half of each wiggle trace cycle.

The output of circuit 103 is indicated by the waveform 105 at terminal 106. It is generated in circuit 103 by combining a variable negative bias consisting of −15 volts and a±10 clip level voltage. This produces a positively biased inverted signal at terminal 106. The positive portion of this signal is fed back through diode 114 and resistor 115 to the summing junction of operational amplifier 110. The negative portion of this signal, however, causes the current to be fed back through diode 112 only (essentially a zero resistance path), thus causing 100 percent feedback resulting in no gain (zero volts) at terminal 106. Therefore, circuit 103 lops off (or clips) the original signal as determined by the clip level voltage which is in proportion to the spacing of the seismic traces. Circuit 117 restores the signal to its original mean level, relative to ground, by adding again the −15 volts and the clip level voltage to the signal. Since operational amplifier 116 also inverts, the clipped peak appears as the positive portion of waveform 120 as shown at terminal 119.

In accordance with the present invention, it is the waveform 120 that comprises the individual seismic trace that is recorded in side-by-side relation to other physically adjacent geophone generated traces. The positive half of each wave such as 120 is then filled to provide a composite wiggle trace and variable area representation of the seismic energy. The remainder of the circuit of FIG. 2 accurately positions the top portion of a sawtooth wave (of relatively high frequency compared to the seismic wave frequency) so that the peak of each sawtooth wave is on the zero crossing axis and with the bottom portion of each sawtooth wave blanked out from its beginning to a desired level, the lopped off top of waveform 120.

Figure 3:
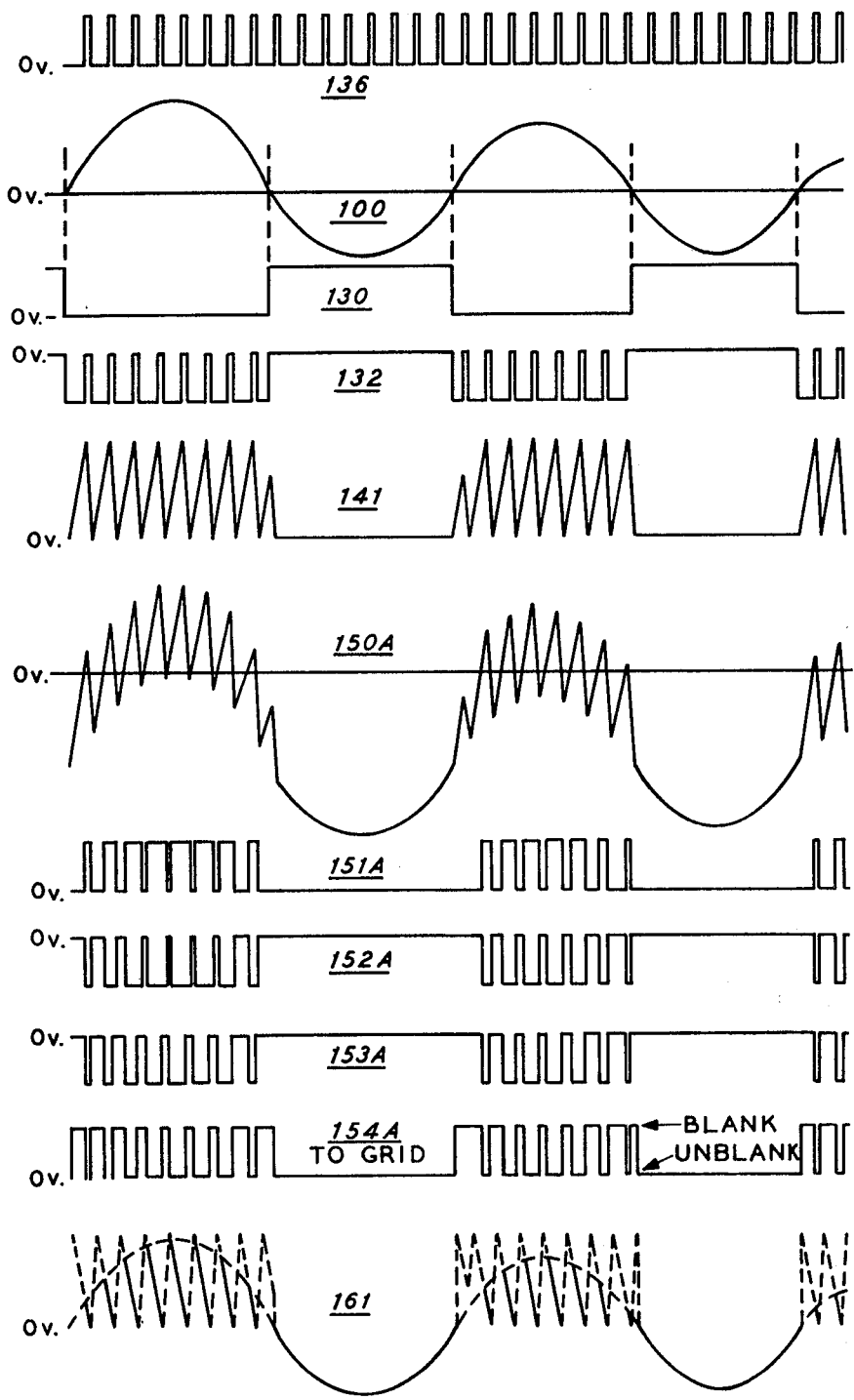
FIG. 3 is a set of waveform diagrams illustrating in greater detail the outputs of various parts of the circuits shown in FIG. 2.

As indicated before, the other input from terminal 101 is into circuit 104. The primary function of this circuit is to form an approximately square waveform having the same axis crossings as waveform 100. Circuit 104 includes amplifier 123 and a pair of diodes 121 and 122 connected front-to-front across a resistor 124. As indicated, waveform 125, appearing as the output of circuit 104, is an approximation of the square wave with the crossover points being the same as those in the original signal 100. Crossover Schmitt trigger 127 then takes signal 125, indicated at pin 126, and through logical inverter 128 produces an inverted square wave during the positive half of the initial signal. Its waveform at pin 129 is indicated as 130 (also shown in FIG. 3). This square wave is then logically OR'ed by gate 131 and sent to sawtooth generator 134.

Generator 134 produces the sawtooth wave that fills the printed display on each positive half cycle of the input seismic signal. As indicated at point 133, the output of logical-OR gate 131 is pulsed square wave 132, so phased that the sawtooth wave is generated only during each positive going portion of the initial signal. The sawtooth repetition rate is controlled by oscillator input (waveform 136) to logic amplifier 131. In this arrangement the repetition rate is substantially higher than that of the fundamental waveform, 20 kiloHertz as indicated by input waveform 136, better seen in FIG. 3.

Amplifier 137 acts as a buffer to drive transistor 139 in circuit 134. The −15 volts source supplies condenser 138 and together with transistor 139 generate in amplifier 140 the sawtooth waveform indicated as 141 (also shown in FIG. 3) at outlet terminal 142. Waveform 141 is formed by a plurality of individual ramps during only the positive part of each positive going input signal. This output is then combined with output of unit 117 in a combining circuit 143. As indicated, circuit 143 combines a negative 15 volts, sawtooth wave and the clipped sine wave to produce as an output of amplifier 144 the indicated signal at pin 145 and designated as signal form 146. As there seen, the combined signal is inverted and has added during the positive going portion of the original input signal a combination of the square-clipped sine wave with a sawtooth superimposed thereon. This combined signal is then directed to two different circuits, one of which controls the blanking and unblanking of the cathode-ray beam and is indicated as going to the cathode control of the cathode-ray tube through circuit 150, complementary Schmitt trigger 151, logic inverter 152, and logical-OR gate 153. Amplifier 155 of circuit 150, of course, inverts the signal 146 and Schmidt trigger 151 is set to generate a train of blanking pulses which will blank the portion of the inverted sawtooth which is not within the envelope of the clipped sine wave.

As noted above, FIG. 3 is a series of waveforms indicating one way to combine pulses 136 and sine wave 100 and illustrates outputs of the various circuit elements of FIG. 2. Waveform 150A indicates the addition of the sawtooth waveform and sine wave in operating amplifier 150. During the time waveform 150A is greater than zero volts, it is represented by waveform 151A, produced by Schmitt trigger 151. It is also during this time that the inverted sawtooth waveform portion of final waveform 161 is to be unblanked. Waveform 152A, the output of amplifier 152, is the inverse of waveform 151A, since it is desired to have a positive blanking voltage. The input high-frequency waveform, indicated as 20 kiloHertz (waveform 136) is then OR'ed in circuit 153 with waveform 152A to create waveform 153A. This operation is performed so that the flyback portions of the sawtooth waveform will be blanked even though their voltages are greater than zero volts in waveform 150A. Waveform 153A is then AND'ed in with the waveform at point 127A, the output of Schmitt trigger 127 in AND gate 154 so that blanking will occur only during the peak, or positive portion, of each sine wave as indicated by waveform 154A. In this way only the full line portions of the curve designated as 161 will appear on the face of the cathode-ray tube and all other portions, shown by the broken lines, are blanked by control of the grid of the cathode-ray tube.

The values of the individual resistors in the designation of the circuit elements in one embodiment of the invention are indicated on FIG. 2.

Figure 4A:
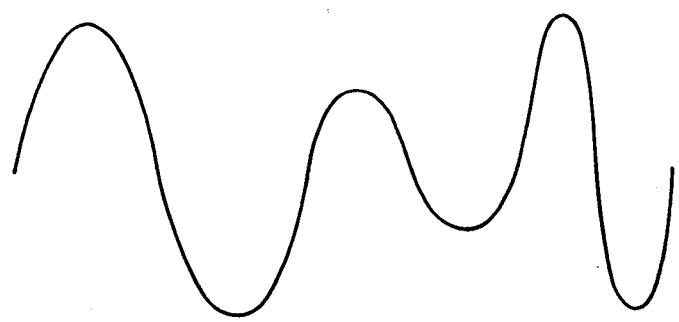
FIG. 4A indicates a sinusoidal wave of varying amplitude and frequency representing a seismic trace.
Figure 4B:
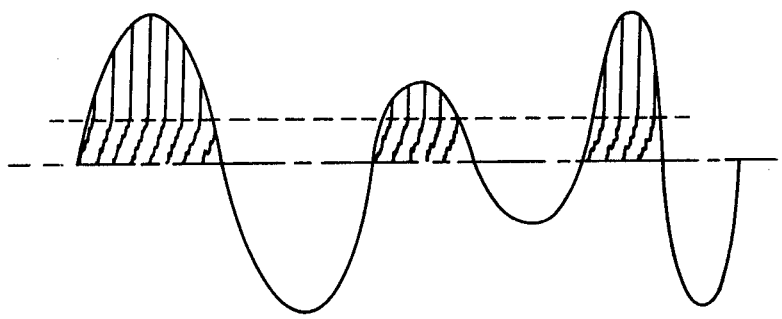
FIG. 4B indicates application of a prior art display to the trace of FIG. 4A.
Figure 4C:
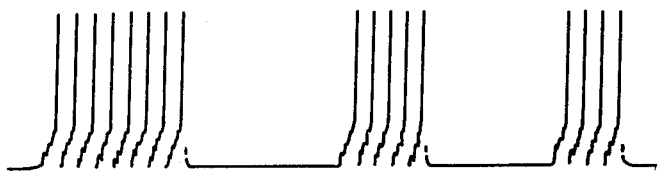
FIG. 4C indicates a normal sawtooth wave generated during each positive going half-cycle of the trace.

An indication of the form of wave display contemplated by the present invention is illustrated in the FIGS. 4A to 4H. FIG. 4A, in general, represents a seismic trace of varying frequency and amplitude. FIG. 4B shows the prior art applied to the waveform of FIG. 4A. As there seen, a sawtooth waveform is used to fill the peaks of each positive going half of each seismic cycle. With the peak, truncated or lopped off at a low level, the jiggles in the start of each sawtooth are particularly objectionable. Since lopping of the peaks permits a denser display of traces for a given time section or seismic section, the present invention permits a cleaner and more definite display of the seismic data in both wiggle trace and variable area without requiring full waveform display. A particular advantage of the arrangement is that a seismologist may more readily understand or appreciate the correlation between adjacent traces (as in FIG. 5) and the information contained therein by a denser packing and a clearer filling of the truncated peaks.

Figure 4D:
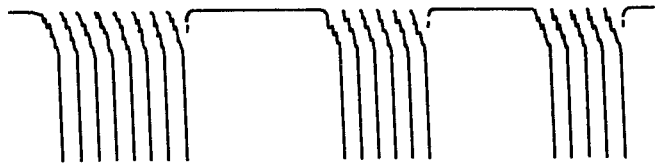
FIG. 4D indicates an inverted sawtooth wave similar to FIG. 4C.
Figure 4E:
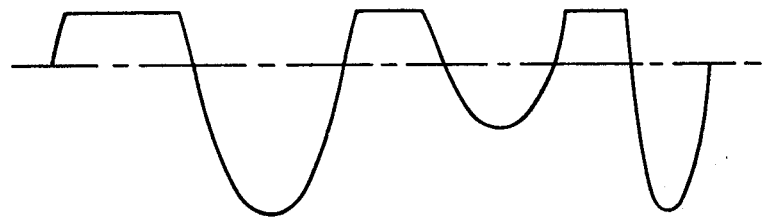
FIG. 4E is a truncated sinusoidal wave in accordance with a preferred form of the present invention.
Figure 4F:
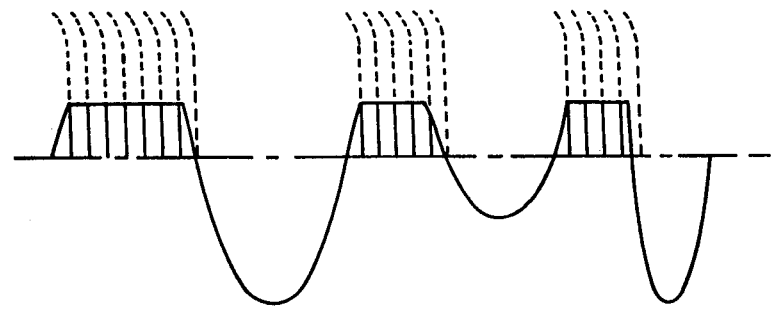
FIG. 4F is a combination of FIG. 4D and FIG. 4E in accordance with one form of the present invention.

FIG. 4C indicates, in general, a sawtooth waveform corresponding to the general waveform of FIG. 4A. FIG. 4D indicates an inversion or reversal of the waveform of FIG. 4C. FIG. 4E indicates a truncation of the peaks in accordance with the present invention and FIG. 4F shows a combination of FIGS. 4E and 4D in accordance with this invention.

Figure 4G:
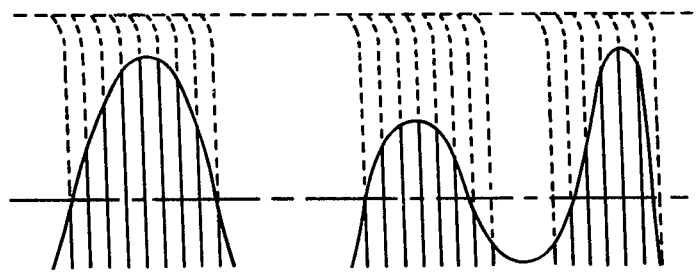
FIG. 4G is an alternative form of variable area presentation of the present invention.
Figure 4H:
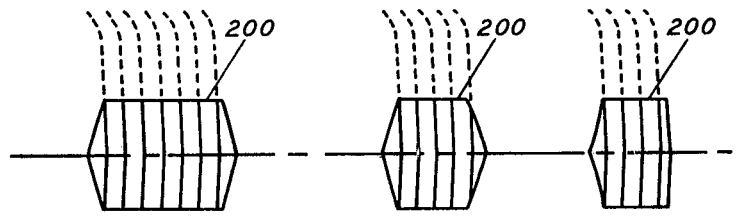
FIG. 4H is still another form of signal representation using this invention.

FIG. 4G is an alternative, variable area display in which the troughs have been truncated or eliminated below the zero crossing axis of the waveform of FIG. 4A. In accordance with this invention, the tops or peaks of each sawtooth are positioned at a known level above the expected extrema of the seismic signal. Alternatively, as in FIG. 4H, only the peaks, that is, all parts of the signal above zero axis are shown along with a mirror image of each positive half of the signal. In such an arrangement, the bottoms of each peak, of course, are terminated when the sawtooth reaches the zero axis of the sinusoidal curve. The tops of the peak are truncated on both sides, as at line 200, to present a relatively square appearing variable area trace within fixed widths. Such a display, of course, is a full variable area display without preservation of waveform by the original wiggle trace.

Figure 5:
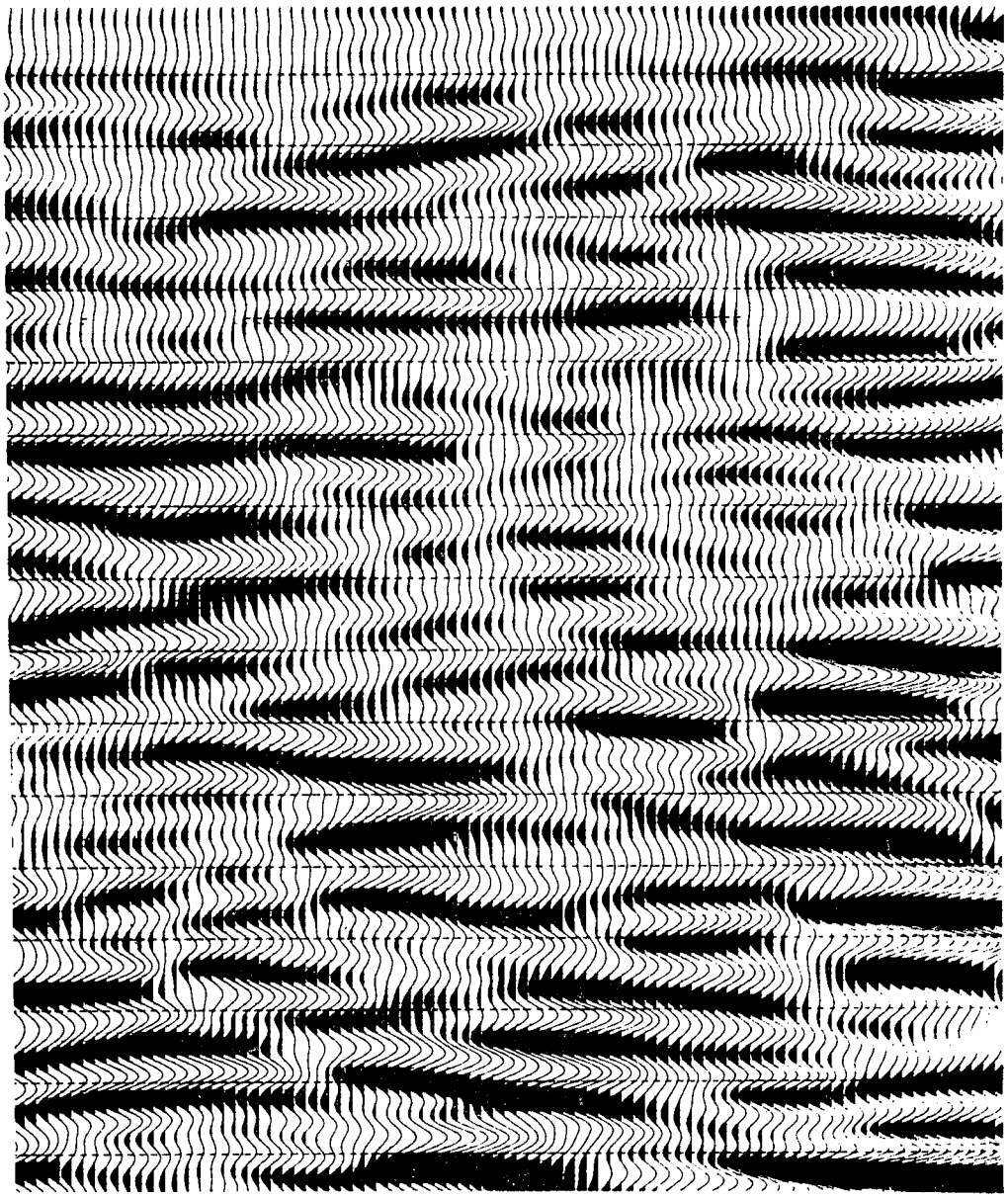
FIG. 5 is a portion of an actual seismic profile recorded in accordance with the preferred form of display using the present invention.

FIG. 5 illustrates a portion of an actual seismic profile formed by a plurality of seismic traces displayed in accordance with the method of the present invention using a variable area-wiggle trace display mode. It will be particularly noted that the tops of the truncated positive-going wave on each trace exactly touches the zero or base line of the adjacent trace. Any overlap would have resulted in a darkening of the lower and upper parts respectively of the neighboring traces where the positive amplitudes exceed the alloted space.

Various modifications and changes will occur to those skilled in the art and such changes may be made without departing from the scope of the appended claims. All such modifications coming within the scope of the claims are intended to be included therein.

I claim:

1. The method of plotting a generally sinusoidal voltage trace so that the area between said trace and its mean line is shaded on one side of said means line by means of a sawtooth wave of substantially higher frequency than that of said trace, comprising:

a. generating a sawtooth voltage of amplitude greater than the voltage difference between the expected extrema of said trace and said mean line of said trace, b. applying at least one of the operations consisting of inversion and translation to said sawtooth voltage to cause its points of transition from relatively slow amplitude change to relatively fast amplitude change to be at a predetermined voltage relative to said generally sinusoidal trace, and to cause its points of transition from relatively fast amplitude change to relatively slow amplitude change to be beyond said expected extrema, so that during the shading of said generally sinusoidal trace, said points of transition from relatively fast amplitude change to relatively slow amplitude change are not plotted in said shaded area.

2. The method in accordance with claim 1 in which said predetermined voltage of transition points from relatively slow amplitude change to relatively fast amplitude is the mean voltage of said generally sinusoidal trace.

3. The method of plotting a single seismic trace in the form of a combined wiggle trace-variable area display which comprises generating an electrical signal having an inverted sawtooth waveform, combining a seismic signal of generally sinusoidal waveform with a constant amplitude electrical signal and said inverted sawtooth waveform to form a composite signal, modulating at least one set of deflection plates of a cathode-ray tube in response to said composite signal, blanking the electron beam of said cathode-ray tube impinging on the face of said cathode-ray tube when said inverted sawtooth wave contribution to said composite signal exceeds a predetermined value, and photographically recording the position of the cathode ray beam on the face of said cathode ray tube in accordance with the time variations in the instantaneous amplitude of said composite signal during the unblanking of said cathode-ray beam.

4. The method of recording a seismic trace as a variable area display having sharp definition at low amplitudes which comprises applying to a photographic recording medium the instantaneous output of an electron beam displayed on the face of a cathode-ray tube, said electron beam being under the combined control of a sawtooth waveform having a frequency substantially higher than the highest frequency of the seismic signal to be displayed and the seismic signal waveform, the improvement comprising inverting said sawtooth waveform, biasing said inverted waveform to generate a waveform emphasizing substantially only the peak portion of each sawtooth wave, modulating at least a part of each cycle of said seismic signal in response to a train of said biased and inverted waves, applying said modulated seismic signal to the deflection plates of said cathode-ray tube and simultaneously applying to a control electrode of said cathode-ray tube a signal representative of said train waves to unblank said cathode-ray beam when said modulated seismic signal is less than a predetermined value with said train of pulses lying between a predetermined area to form variable area peaks between sinusoidal valleys and recording the displayed beam reflection on said photographic medium.

5. Method in accordance with claim 2 wherein lateral deflection of said cathode-ray tube is confined to a predetermined width so that the top of each variable area peaks does not overlie the area of an adjacent seismic trace, when multiple traces are recorded side-by-side on the photographic record.

6. The improved method of photographically recording low-amplitude portions of a variable area display of a seismic trace instantaneously applied by an electron beam to the face of a cathode-ray tube which comprises a. generating a first electrical signal having an inverted sawtooth waveform and having a frequency several times the highest frequency of the information portion of a seismic trace, b. generating another electrical signal having a sinusoidal waveform corresponding to the information portion of a field-generated seismic trace, c. modulating said other electrical signal with said first electrical signal to produce a composite signal, d. applying said composited electrical signal to the electron beam deflection element of a cathode-ray tube, e. simultaneously applying to an intensity control element of said cathode-ray tube a blanking signal corresponding to a predetermined amplitude corresponding to the initial portion of each inverted peak portions of said first electrical signal, and f. photographically recording the face of said cathode-ray tube with simultaneous relative movement in at least one direction between the photographic medium and said cathode-ray tube face, while said cathode-ray electron beam is being controlled in response to said composite signal and said blanking signals, whereby the recorded inverted sawtooth waveform is relatively uniform in line width and density at low amplitudes of the seismic signals to print a uniformly dense variable area on said photographic recording medium representing said seismic trace.